(12) United States Patent
Abedini et al.

(10) Patent No.: US 12,107,802 B2
(45) Date of Patent: Oct. 1, 2024

(54) ENHANCED DUPLEXING CAPABILITY INDICATION IN WIRELESS NETWORKS

(71) Applicant: QUALCOMM Incorporated, San Diego, CA (US)

(72) Inventors: Navid Abedini, Basking Ridge, NJ (US); Qian Zhang, Basking Ridge, NJ (US); Naeem Akl, Somerville, NJ (US); Jianghong Luo, Skillman, NJ (US); Luca Blessent, Whitehouse Station, NJ (US); Tao Luo, San Diego, CA (US); Karl Georg Hampel, Jersey City, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 17/647,806

(22) Filed: Jan. 12, 2022

(65) Prior Publication Data
US 2022/0231826 A1 Jul. 21, 2022

Related U.S. Application Data

(60) Provisional application No. 63/138,209, filed on Jan. 15, 2021.

(51) Int. Cl.
*H04L 5/14* (2006.01)
*H04W 56/00* (2009.01)
(Continued)

(52) U.S. Cl.
CPC ............ *H04L 5/14* (2013.01); *H04W 56/001* (2013.01); *H04W 74/0841* (2013.01); *H04W 88/14* (2013.01)

(58) Field of Classification Search
CPC ....... H04L 5/14; H04L 5/0023; H04L 5/0051; H04W 56/001; H04W 74/0841;
(Continued)

(56) References Cited

U.S. PATENT DOCUMENTS

2020/0314738 A1* 10/2020 Qi ..................... H04W 56/0015
2021/0352697 A1* 11/2021 Irukulapati ........... H04L 5/0048
(Continued)

FOREIGN PATENT DOCUMENTS

| GB | 2579765 A | 7/2020 |
| WO | WO-2020067829 A1 | 4/2020 |

(Continued)

OTHER PUBLICATIONS

International Search Report and Written Opinion—PCT/US2022/070175—ISA/EPO—May 2, 2022.
(Continued)

*Primary Examiner* — Sudesh M Patidar
(74) *Attorney, Agent, or Firm* — QUALCOMM Incorporated

(57) ABSTRACT

Various aspects of the present disclosure generally relate to wireless communication. In some aspects, a wireless node may transmit an enhanced duplexing capability indication that indicates an enhanced duplexing capability status associated with one or more resources. The wireless node may communicate based at least in part on a resource of the one or more resources. Numerous other aspects are described.

30 Claims, 9 Drawing Sheets

(51) Int. Cl.
*H04W 74/0833* (2024.01)
*H04W 88/14* (2009.01)

(58) Field of Classification Search
CPC ............. H04W 88/14; H04W 74/0833; H04W 84/047; H04W 88/08
See application file for complete search history.

(56) References Cited

U.S. PATENT DOCUMENTS

| | | | | |
|---|---|---|---|---|
| 2021/0360618 | A1* | 11/2021 | Novlan | H04W 56/001 |
| 2022/0086897 | A1* | 3/2022 | Wei | H04W 74/0833 |
| 2022/0110136 | A1* | 4/2022 | Li | H04B 17/345 |
| 2022/0191863 | A1* | 6/2022 | Miao | H04L 5/0053 |
| 2022/0232481 | A1* | 7/2022 | Kusashima | H04W 52/10 |
| 2022/0256485 | A1* | 8/2022 | Dortschy | H04L 5/0035 |
| 2022/0346044 | A1* | 10/2022 | Dahlman | H04W 56/0015 |
| 2023/0247574 | A1* | 8/2023 | Ghanbarinejad | H04W 56/001 370/503 |
| 2024/0064733 | A1* | 2/2024 | Ghanbarinejad | H04L 5/0094 |
| 2024/0155652 | A1* | 5/2024 | Noh | H04W 72/27 |

FOREIGN PATENT DOCUMENTS

| | | | |
|---|---|---|---|
| WO | WO-2020222293 A1 | 11/2020 | |
| WO | WO-2022021181 A1 * | 2/2022 | ...... H04W 36/00835 |

OTHER PUBLICATIONS

Qualcomm Incorporated: "Resource Management for Enhanced Duplexing", 3GPP TSG RAN WG1 Meeting #102-e, 3GPP Draft, R1-2006825, 3rd Generation Partnership Project (3GPP), Mobile Competence Centre, 650, Route Des Lucioles, F-06921 Sophia-Antipolis Cedex, France, vol. RAN WG1, No. Aug. 17, 2020-Aug. 28, 2020, Aug. 8, 2020 (Aug. 8, 2020), 6 Pages, XP051918275, Retrieved from the Internet: URL: https://ftp.3gpp.org/tsg_ran/WG1_RL1/TSGR1_102-e/Docs/R1-2006825.zip R1-2006825—Resource management for enhanced duplexing.docx [retrieved on Aug. 8, 2020] Proposal 1, page fourth Section "Resource management extensions for enhanced duplexing", p. third.

* cited by examiner

ENHANCED DUPLEXING CAPABILITY INDICATION IN WIRELESS NETWORKS

CROSS-REFERENCE TO RELATED APPLICATION

This Patent application claims priority to U.S. Provisional Patent Application No. 63/138,209, filed on Jan. 15, 2021, entitled "ENHANCED DUPLEXING CAPABILITY INDICATION IN INTEGRATED ACCESS AND BACKHAUL NETWORKS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for enhanced duplexing capability indication in wireless networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth and/or transmit power, among other examples). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, and/or a 5G Node B, among other examples.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an integrated access and backhaul (IAB) node for wireless communication in an IAB network includes a memory; and one or more processors coupled to the memory, the one or more processors configured to: transmit an enhanced duplexing capability indication that indicates an enhanced duplexing capability status associated with one or more resources; and communicate via the IAB network based at least in part on a resource of the one or more resources.

In some aspects, an IAB node for wireless communication in an IAB network includes a memory; and one or more processors coupled to the memory, the one or more processors configured to: receive an enhanced duplexing capability indication that indicates an enhanced duplexing capability status associated with one or more resources; and perform a wireless communication action based at least in part on the enhanced duplexing capability indication.

In some aspects, a method of wireless communication performed by an IAB node in an IAB network includes transmitting an enhanced duplexing capability indication that indicates an enhanced duplexing capability status associated with one or more resources; and communicating via the IAB network based at least in part on a resource of the one or more resources.

In some aspects, a method of wireless communication performed by an IAB node in an IAB network includes receiving an enhanced duplexing capability indication that indicates an enhanced duplexing capability status associated with one or more resources; and performing a wireless communication action based at least in part on the enhanced duplexing capability indication.

In some aspects, a non-transitory computer-readable medium storing a set of instructions for wireless communication includes one or more instructions that, when executed by one or more processors of an IAB node, cause the IAB node to: transmit an enhanced duplexing capability indication that indicates an enhanced duplexing capability status associated with one or more resources; and communicate via the IAB network based at least in part on a resource of the one or more resources.

In some aspects, a non-transitory computer-readable medium storing a set of instructions for wireless communication includes one or more instructions that, when executed by one or more processors of an IAB node, cause the IAB node to: receive an enhanced duplexing capability indication that indicates an enhanced duplexing capability status associated with one or more resources; and perform a wireless communication action based at least in part on the enhanced duplexing capability indication.

In some aspects, an apparatus for wireless communication in an IAB network includes means for transmitting an enhanced duplexing capability indication that indicates an enhanced duplexing capability status associated with one or more resources; and means for communicating via the IAB network based at least in part on a resource of the one or more resources.

In some aspects, an apparatus for wireless communication in an IAB network includes means for receiving an enhanced duplexing capability indication that indicates an enhanced duplexing capability status associated with one or more resources; and means for performing a wireless communication action based at least in part on the enhanced duplexing capability indication.

In some aspects, a method, device, apparatus, computer program product, non-transitory computer-readable medium, user equipment, base station, node, wireless communication device, integrated access and backhaul node, and/or processing system as substantially described herein with reference to and as illustrated by the accompanying drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, and/or algorithms, among other examples (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
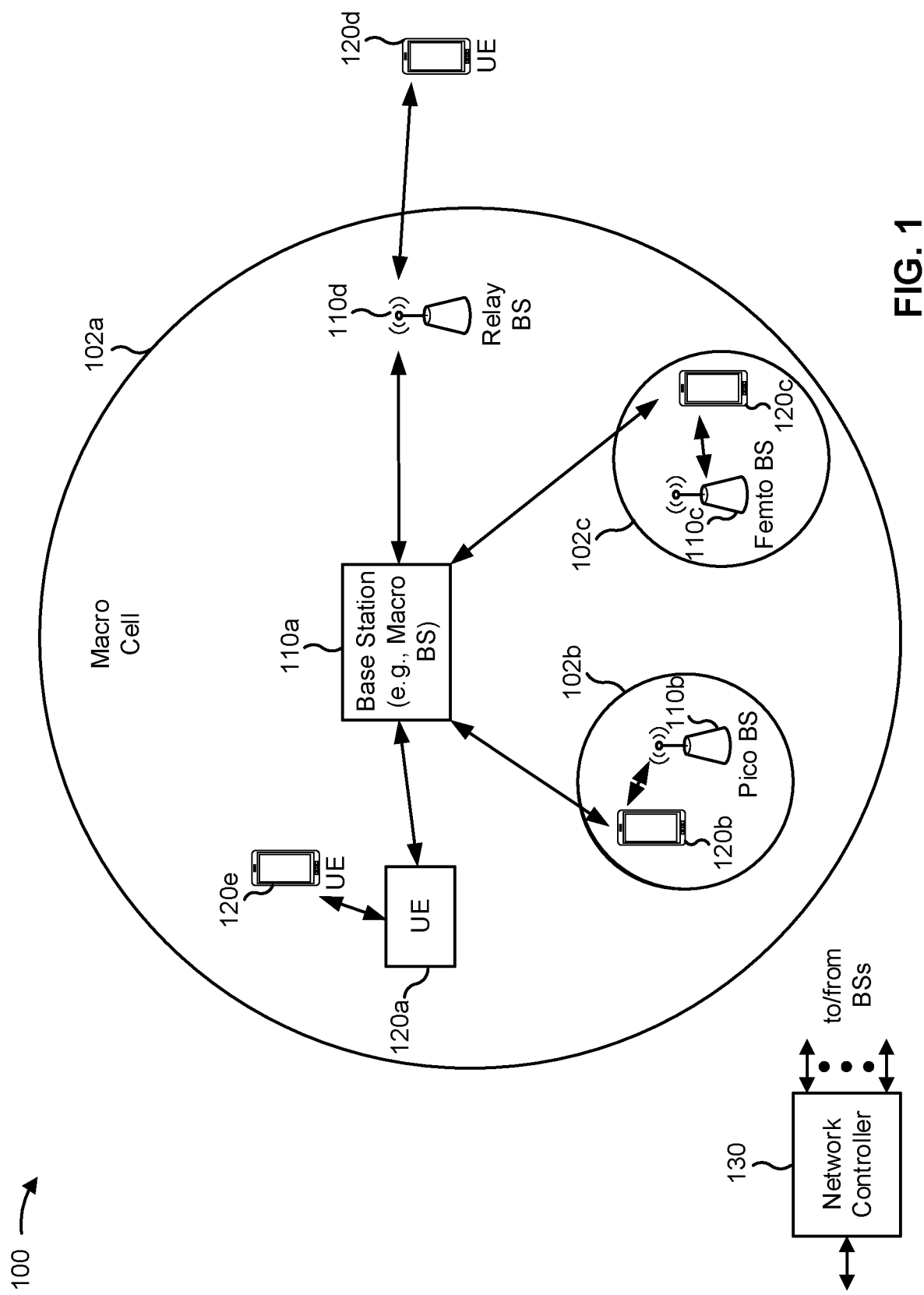
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1. For example, the network 100 may include any number of other types of devices and/or arrangements of devices, among other examples.

Figure 2:
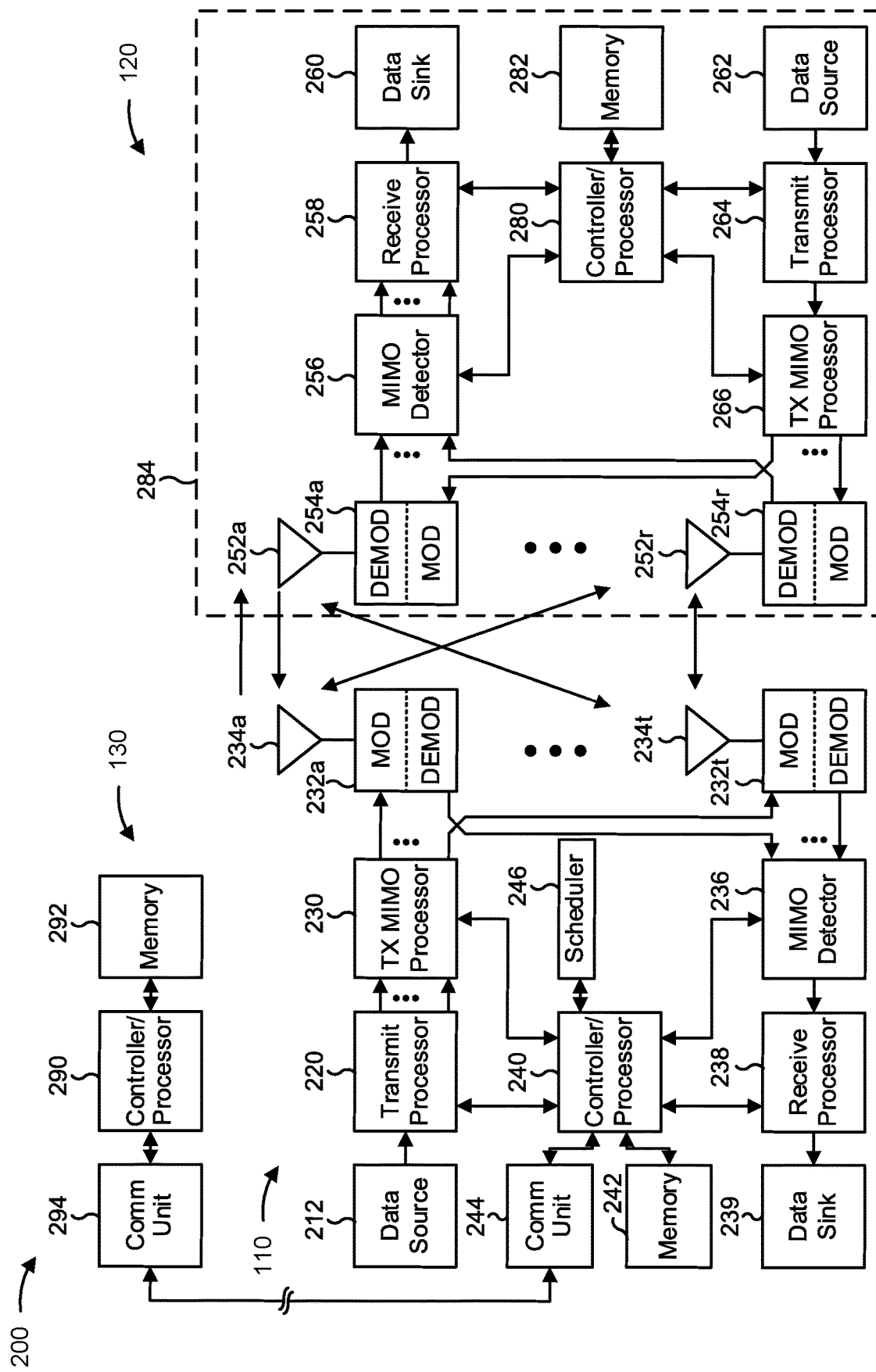
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-9).

Controller/processor 240 of base station 110, controller/processor 280 of UE 120, and/or any other component(s) of FIG. 2 may perform one or more techniques associated with enhanced duplexing capability indication in integrated access and backhaul networks, as described in more detail elsewhere herein. In some aspects, the IAB node described herein is the base station 110, is included in the base station 110, or includes one or more components of the base station 110 shown in FIG. 2. In some aspects, the IAB node described herein is the UE 120, is included in the UE 120, or includes one or more components of the UE 120 shown in FIG. 2, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the IAB node includes means for transmitting an enhanced duplexing capability indication that indicates an enhanced duplexing capability status associated with one or more resources; or means for communicating via the IAB network based at least in part on a resource of the one or more resources. In some aspects, the IAB node includes means for transmitting an access indication that indicates a synchronization signal block (SSB) transmission configuration (STC) index of one or more STC indexes that are associated with network access. In some aspects, the IAB node includes means for transmitting an indication that the STC index that is associated with network access corresponds to the cell-defining (CD)-SSB indicator. In some aspects, the IAB node includes means for transmitting a CD-SSB indicator that indicates a CD-SSB associated with at least one SSB resource of the one or more configured SSB resources.

In some aspects, the IAB node includes means for transmitting a random access channel (RACH) indication that indicates an STC index of the one or more STC indexes that is associated with a RACH configuration. In some aspects, the IAB node includes means for receiving the RACH indication from the distributed unit (DU).

In some aspects, the IAB node includes means for receiving an enhanced duplexing capability indication that indicates an enhanced duplexing capability status associated with one or more resources; or means for performing a wireless communication action based at least in part on the enhanced duplexing capability indication. In some aspects, the IAB node includes means for receiving an access indication that indicates an STC index of the one or more STC indexes that is associated with network access. In some aspects, the IAB node includes means for receiving an indication that the STC index that is associated with network access corresponds to the CD-SSB. In some aspects, the IAB node includes means for receiving a CD-SSB indicator that indicates a CD-SSB associated with at least one SSB resource of the one or more configured SSB resources. In some aspects, the IAB node includes means for receiving a RACH indication that indicates an STC index of the one or more STC indexes that is associated with a RACH configuration.

In some aspects, the means for the IAB node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the IAB node to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2. For example, a UE and/or a base station may include any number of other components not depicted in FIG. 2.

Figure 3:
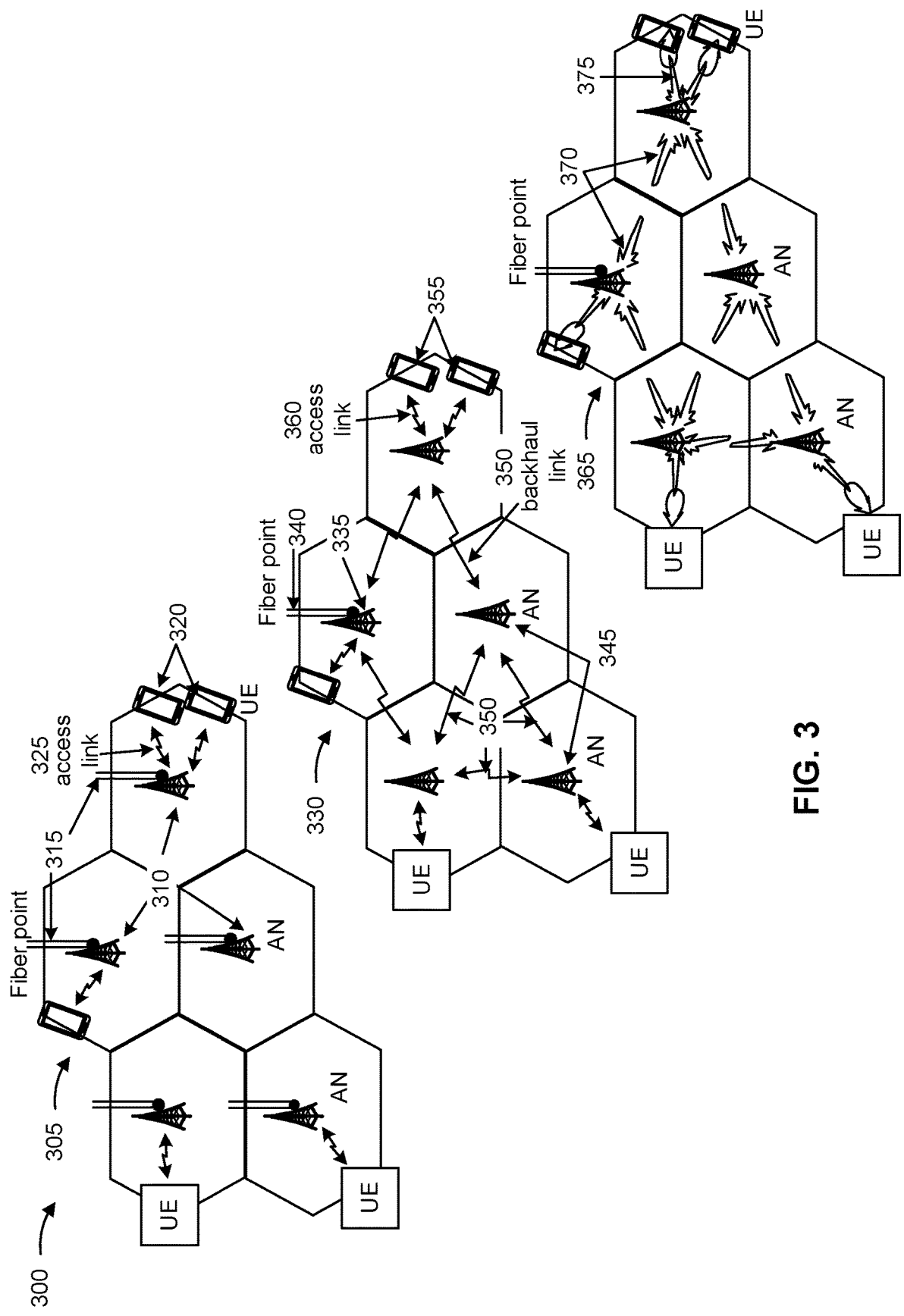
FIG. 3 is a diagram illustrating examples of radio access networks, in accordance with the present disclosure.

FIG. 3 is a diagram illustrating examples 300 of radio access networks, in accordance with the disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3. For example, any number of additional types of access networks may be contemplated as being interconnected with access networks shown in FIG. 3.

Figure 4:
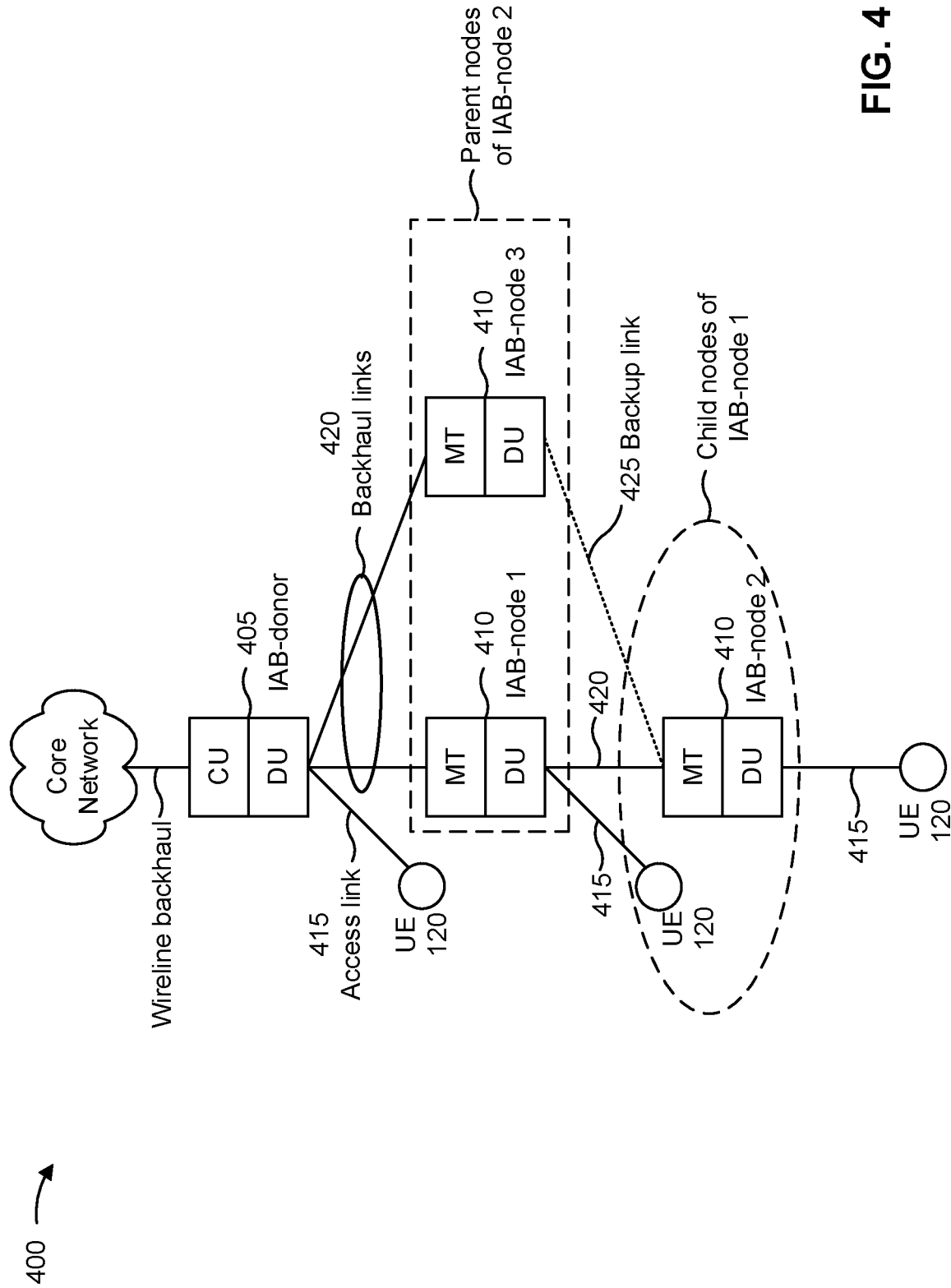
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function. In some aspects, an IAB donor 405 may include a base station 110, such as an anchor base station, as described above in connection with 3. As shown, an IAB donor 405 may include a central unit (CU), which may perform access node controller (ANC) functions and/or access and mobility management function (AMF) functions. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (FLAP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410 (e.g., a base station), and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, and indicated above, "node" or "wireless node" may refer to a base station, a UE, an IAB donor 405 or an IAB node 410.

As indicated above, FIG. 4 is provided as an example. Other examples may differ from what is described with regard to FIG. 4. For example, an IAB network may include any number of levels of hierarchy and intercommunication.

Figure 5:
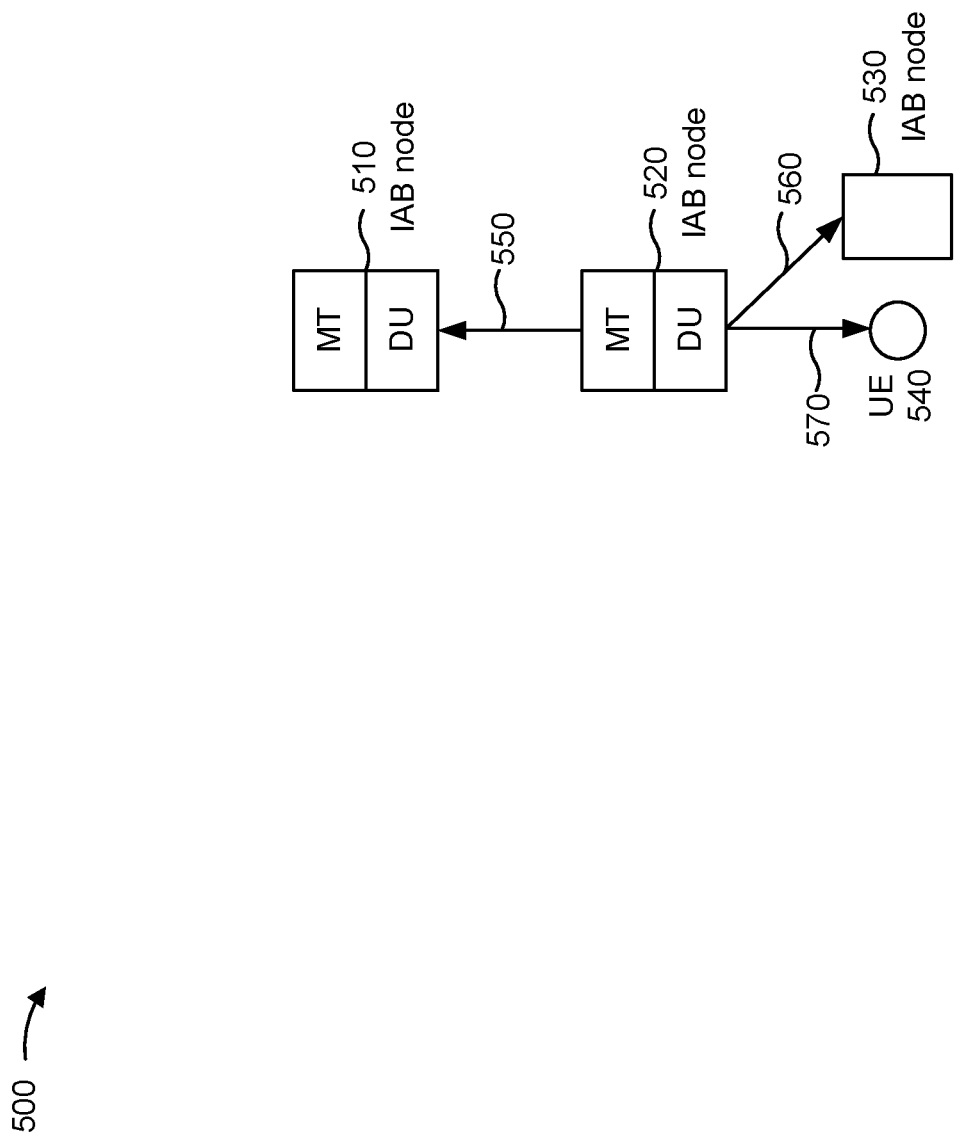
FIG. 5 is a diagram illustrating an example associated with enhanced duplexing in IAB networks, in accordance with the present disclosure.

FIG. 5 is a diagram illustrating an example 500 of enhanced duplexing in an IAB network, in accordance with the disclosure. As shown, an IAB node 510, an IAB node 520, an IAB node 530, and a UE 540 may communicate within an IAB network. The IAB node 510 may be a parent node of the IAB node 520, which may be a parent node of the IAB node 530. The UE 540 may be a child node of the IAB node 520.

As shown by reference number 550, the IAB node 520 may transmit a communication to the IAB node 510. As shown by reference number 560, the IAB node 520 may transmit a communication to the IAB node 530, and as shown by reference number 570, the IAB node 520 may transmit a communication to the UE 540. In some cases, the IAB node 520 may transmit two or more of the communications simultaneously. In enhanced duplexing cases, the IAB node 520 may have simultaneous operation of the MT of the IAB node 520 and the DU of the IAB node 520. For example, in an enhanced duplexing case, the MT may transmit the communication associated with reference number 550 to the IAB node 510 at the same time that the DU transmits the communication associated with reference number 560 to the IAB node 530 and/or the communication associated with reference number 570 to the UE 540. In aspects in which the IAB node 520 is a base station such as a gNB (which may not have a co-located MT), the base station may support enhanced duplexing. In such an enhanced duplexing case, the base station may transmit and/or receive two or more communications simultaneously. For example, the base station may transmit a communication to one UE and/or child node (e.g., UE 540) and simultaneously receive a communication from another UE and/or child node (e.g., IAB node 530).

In another enhanced duplexing case, the MT of the IAB node 520 may receive a communication (e.g., from the IAB node 510) at the same time that the DU of the IAB node 520 transmits a communication (e.g., the communication associated with reference number 560 to the IAB node 530 and/or the communication associated with reference number 570 to the UE 540). In another enhanced duplexing case, the MT of the IAB node 520 may receive a communication (e.g., from the IAB node 510) at the same time that the DU of the IAB node 520 receives a communication (e.g., from the IAB node 530 and/or the UE 540). In another enhanced duplexing case, the MT of the IAB node 520 may transmit a communication (e.g., to the IAB node 510) at the same time that the DU of the IAB node 520 receives a communication (e.g., from the IAB node 530 and/or the UE 540).

In some cases, an IAB node can indicate to a CU whether it can support any of the four enhanced duplexing cases. This information can be further provided by the CU to a parent node. However, the indication often is static and unconditional. "Conditional enhanced duplexing" may refer to enhanced duplexing that is available and/or capable with respect to one or more beams, characteristics of one or more beams, a random access channel (RACH) procedure, and/or as aspect of a RACH procedure, among other examples. Because the enhanced duplexing indications do not account for conditional enhanced duplexing capabilities, devices may not be aware of such capabilities and, as a result, enhanced duplexing in IAB networks may be inefficient, which may negatively impact network performance.

Aspects of the techniques and apparatuses described herein may provide enhanced duplexing capability indications that may indicate conditional capabilities. In some aspects, the enhanced duplexing capability indications may be transmitted using resource elements that are already specified in a wireless communication standard. Accordingly, aspects, may facilitate providing conditional enhanced duplexing capability information between devices in an IAB network. As a result, aspects of the techniques and apparatuses described herein may improve efficiency in enhanced duplexing in IAB networks, which may positively impact network performance.

In some cases, for example, an STC may be used to indicate configured SSB resources that can be primarily used for inter-IAB node discovery and/or access procedures. For example, a DU may transmit an STC indication to a CU or UE to indicate up to 5 STCs for each served cell (which may be indicated using an "IAB info IAB-DU" parameter in a "Served Cell Information" data field). A CU may transmit an STC indication to a DU to indicate up to 5 STCs for each activated cell of an IAB-DU (which may be indicated using an "IAB Info IAB-donor-CU" parameter in a "Cells to be Activated List" data field). A CU may transmit an STC indication to a parent node DU to indicate the STC configuration of an IAB node (which may be indicated using an "IAB STC Info" parameter in a "Child Node Cells List" data field). Up to 5 STCs may be configured for a DU cell: 1 for access and four for the backhaul. However, the utility of the STC for access has not been defined. Accordingly, aspects described herein may utilize the STC specified for access to transmit enhanced duplexing capability indications without unnecessarily increasing signalling overhead.

In some aspects, indications of SSBs and/or STC indexes may be used to refer to beams and/or characteristics associated with beams, among other examples. In some aspects, for example, an IAB DU may indicate, to a CU, one or multiple enhanced duplexing capability statuses associated with one or more resources. The one or more resources may include time resources, frequency resources, and/or spatial resources (e.g., beams, directions). The statuses may be indicated using a pair of values, (SSB index, STC index), associated with one of its served cells. A status may indicate whether the IAB DU can support an enhanced duplexing case such as, for example, an enhanced duplexing case with an MT (e.g., UE) component carrier (CC). In some aspects, for example, the above information may be shared by a CU with a parent node DU or by a base station with a UE.

In some aspects, an IAB MT may indicate (to a serving cell) one or multiple of its co-located DU cells' statuses using a value pair, (SSB index, STC index), which may indicate whether the IAB MT can support an enhanced duplexing case with the parent node cell. In some aspects, an IAB node may indicate statuses using one or more status indicators (e.g., SSB index, STC index, DU cell index) for one or multiple of its beams. In some aspects, a beam may be indicated using a transmission configuration indicator (TCI), a TCI state, and/or a sounding reference signal resource indicator (SRI), among other examples.

In some aspects, conditional enhanced duplexing capability status may be indicated implicitly using the access STC indicator. Identification of the access STC indicator may be explicit or implicit. For example, the first (or the last) STC indicator in a list may be associated with access. In some aspects, the STC indicator associated with access may be associated with one or more cell-defining SSBs (CD-SSBs). In some aspects, the STC indicator with the "SSB Frequency Info" matching one of the sync-raster frequencies may be assumed to be associated with access and/or CD-SSBs.

In some aspects, enhanced duplexing capability indications may be associated with RACH capabilities. For example, an IAB node, when reporting its STC indicators to another IAB node (e.g., to a CU or a UE), may indicate which STC indicator is associated with the RACH. In some aspects, the IAB node may indicate which RACH occasions (e.g., within a RACH period) can or cannot support enhanced duplexing with an MT CC.

As indicated above, FIG. 5 is provided as an example. Other examples may differ from what is described with regard to FIG. 5. For example, any number of other devices and/or IAB nodes may participate in duplexing simultaneously.

Figure 6:
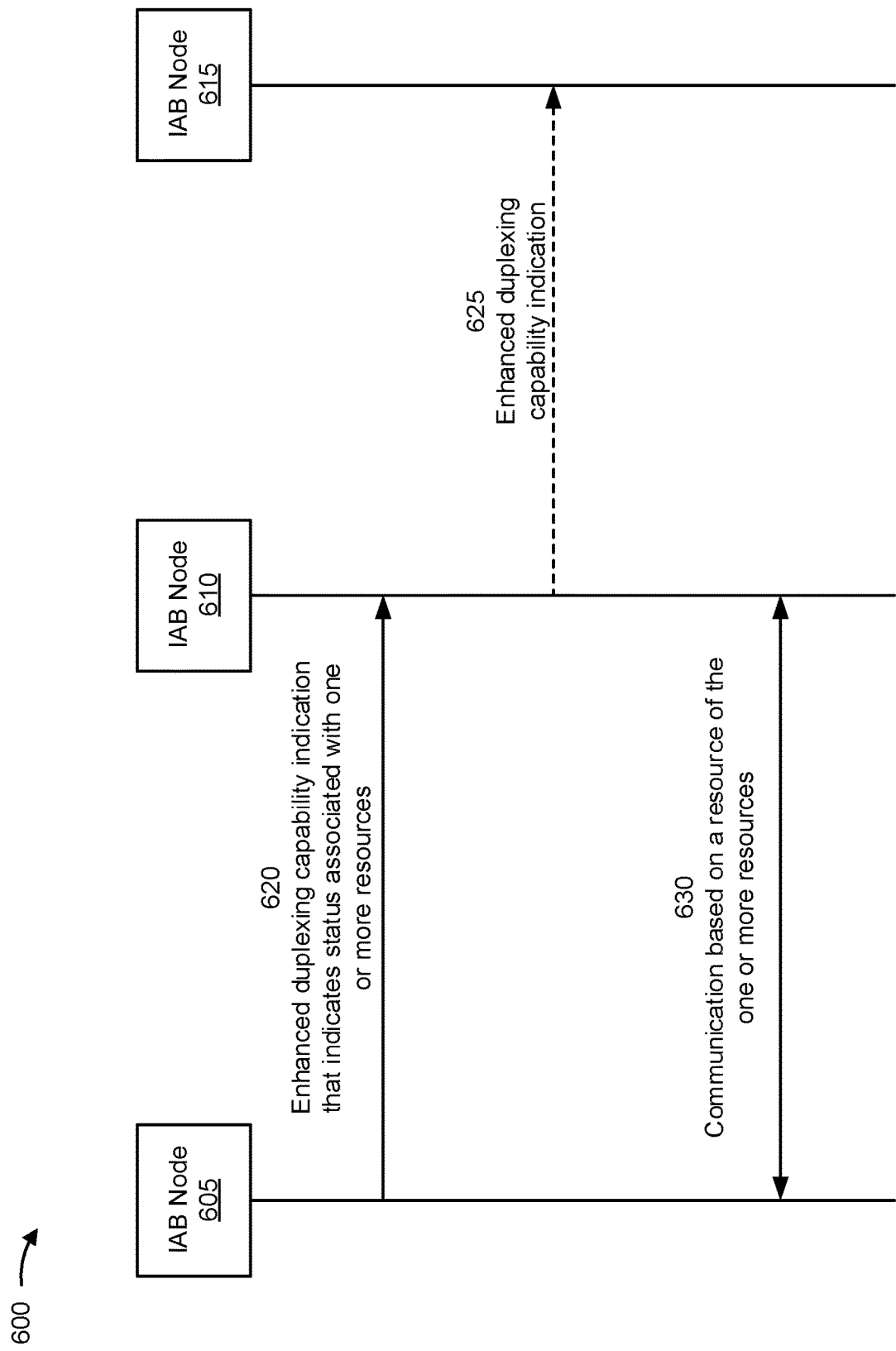
FIG. 6 is a diagram illustrating an example associated with enhanced duplexing capability indication in IAB networks, in accordance with the present disclosure.

FIG. 6 is a diagram illustrating an example 600 associated with enhanced duplexing capability indication in IAB networks, in accordance with the present disclosure. As shown in FIG. 6, an IAB node 605, an IAB node 610, and an IAB node 615 may communicate within an IAB network. In some aspects, the IAB node 605 may represent a parent node of the IAB node 610, and the IAB node 615 may represent a CU. In some aspects, the IAB node 605 may represent a base station (e.g., a gNB), the IAB node 610 may represent a UE, and the IAB node 615 may represent a CU. In some aspects, the IAB node 605 may represent a UE, the IAB node 610 may represent a base station (e.g., a gNB), and the IAB node 615 may represent a CU.

As show by reference number 620, the IAB node 605 may transmit, and the IAB node 610 may receive, an enhanced duplexing capability indication that indicates an enhanced duplexing capability status associated with one or more resources. In some aspects, the one or more resources may include a frequency resource, a time resource, and/or a spatial resource. In some aspects, the one or more resources may include one or more beams associated with a served cell. As shown by reference number 625, the IAB node 610 may transmit the enhanced duplexing capability indication to the IAB node 615. For example, the IAB node 610 may be a CU and may transmit an enhanced duplexing capability indication received from a DU (IAB node 605) to a parent node (IAB node 615) of the DU.

In some aspects, the one or more resources may include one or more configured SSB resources. For example, the enhanced duplexing capability indication may indicate the one or more configured SSB resources based at least in part on an indication of one or more SSB indexes associated with a served cell. In some aspects, the enhanced duplexing capability indication may indicate the one or more configured SSB resources based at least in part on an indication of one or more STC indexes associated with at least one of the one or more SSB indexes. For example, in some aspects, an IAB DU may indicate, to a CU, one or multiple indexes (e.g., SSB index, STC index), associated with one of its served cells, to indicate whether it can (or cannot) support an enhanced duplexing case.

In some aspects, the IAB node 605 may transmit an access indication that indicates an STC index of the one or more STC indexes that is associated with network access. For example, the IAB node may be a DU, in which case transmitting the access indication may include transmitting the access indication to a CU. In some aspects, the IAB node 605 may include a CU, where transmitting the access indication may include transmitting the access indication to a DU and/or a parent node. In some aspects, the access indication may include an implicit indication. For example, transmitting the implicit indication may include transmitting a list of one or more STC indexes, where the STC index that is associated with network access may include a first STC index of the list or a last STC index of the list.

In some aspects, the STC index that is associated with network access may correspond to a CD-SSB. For example, the IAB node 605 may transmit an indication that the STC index that is associated with network access corresponds to the CD-SSB. In some aspects, the STC index that is associated with network access may correspond to SSB frequency information that matches a sync-raster frequency.

In some aspects, the IAB node 605 may transmit a (RACH) indication that indicates an STC index of the one or more STC indexes that is associated with a RACH configuration. For example, the IAB node 605 may be a DU and may transmit the RACH indication to a CU. In some aspects, the IAB node 605 may be a DU and may transmit the RACH indication to a CU. In some aspects, the IAB node 605 may be CU and may transmit the RACH indication to a parent node of a DU. The IAB node 605 may receive the RACH indication from the DU.

In some aspects, the IAB node 605 may include a DU and the enhanced duplexing capability indication may indicate the one or more configured SSB resources associated with a served cell for which the DU can support enhanced duplexing with an MT CC. The IAB node 605 may be a CU and the enhanced duplexing capability indication may indicate the one or more configured SSB resources associated with a served cell for which a DU can support enhanced duplexing with an MT CC. In some aspects, transmitting the enhanced duplexing capability indication may include transmitting the enhanced duplexing capability indication to a parent node DU of the DU.

The IAB node 605 may be an MT and the enhanced duplexing capability indication may indicate the one or more configured SSB resources associated with a served cell for which a co-located DU can support enhanced duplexing with a parent node of the MT, where the co-located DU serves the served cell. The IAB node 605 may transmit the indication to the parent node.

In some aspects, the enhanced duplexing capability indication may indicate one or more beams associated with the MT which the co-located DU can support enhanced duplexing with the parent node of the MT. The enhanced duplexing capability indication may indicate at least one of: an SSB index associated with the one or more configured SSB resources, an STC index associated with the one or more configured SSB resources, a DU cell index associated with the served cell, a TCI state associated with the one or more beams, and/or an SRI associated with the one or more beams, among other examples.

In some aspects, the IAB 605 may transmit a CD-SSB indicator that indicates a CD-SSB associated with at least one SSB resource of the one or more configured SSB resources. The one or more resources may include one or more RACH occasions within a RACH period. In some aspects, the enhanced duplexing capability indication indicates the one or more RACH occasions within the RACH period that can support enhanced duplexing with an MT CC.

As shown by reference number 630, the IAB node 605 and the IAB node 610 may communicate via the IAB network based at least in part on a resource of the one or more resources.

As indicated above, FIG. 6 is provided as an example. Other examples may differ from what is described with respect to FIG. 6. For example, enhanced duplexing capability indications may be associated with any number of other conditions and/or characteristics of communication configurations.

Figure 7:
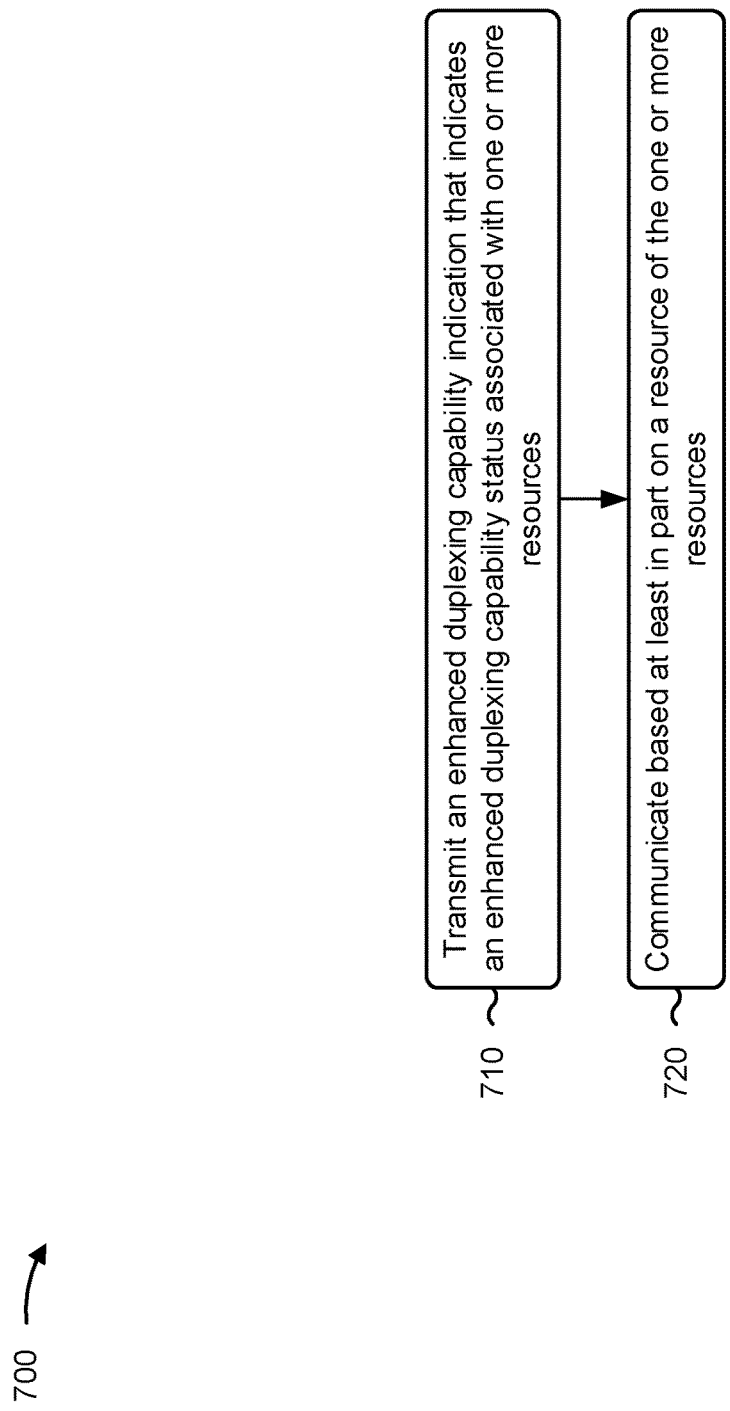
FIGS. 7 and 8 are diagrams illustrating example processes associated with enhanced duplexing capability indication in IAB networks, in accordance with the present disclosure.

FIG. 7 is a diagram illustrating an example process 700 performed, for example, by an IAB node, in accordance with the present disclosure. Example process 700 is an example where the IAB node (e.g., IAB node 605) performs operations associated with enhanced duplexing capability indication in IAB networks.

As shown in FIG. 7, in some aspects, process 700 may include transmitting an enhanced duplexing capability indication that indicates an enhanced duplexing capability status associated with one or more resources (block 710). For example, the IAB node (e.g., using transmission component 904, depicted in FIG. 9) may transmit an enhanced duplexing capability indication that indicates an enhanced duplexing capability status associated with one or more resources, as described above.

As further shown in FIG. 7, in some aspects, process 700 may include communicating via the IAB network based at least in part on a resource of the one or more resources (block 720). For example, the IAB node (e.g., using reception component 902 and/or transmission component 904, depicted in FIG. 9) may communicate via the IAB network based at least in part on a resource of the one or more resources, as described above.

Process 700 may include additional aspects, such as any single aspect or any combination of aspects described below and/or in connection with one or more other processes described elsewhere herein.

In a first aspect, the one or more resources comprise at least one of a frequency resource, a time resource, or a spatial resource.

In a second aspect, alone or in combination with the first aspect, the one or more resources comprise one or more beams associated with a served cell.

In a third aspect, alone or in combination with one or more of the first and second aspects, the one or more resources comprise one or more configured SSB resources.

In a fourth aspect, alone or in combination with the third aspect, the enhanced duplexing capability indication indicates the one or more configured SSB resources based at least in part on an indication of one or more SSB indexes associated with a served cell.

In a fifth aspect, alone or in combination with the fourth aspect, the enhanced duplexing capability indication indicates the one or more configured SSB resources based at least in part on an indication of one or more STC indexes associated with at least one of the one or more SSB indexes.

In a sixth aspect, alone or in combination with the fifth aspect, process 700 includes transmitting an access indication that indicates an STC index of the one or more STC indexes that is associated with network access.

In a seventh aspect, alone or in combination with the sixth aspect, the IAB node comprises a distributed unit, wherein transmitting the access indication comprises transmitting the access indication to a central unit.

In an eighth aspect, alone or in combination with one or more of the sixth through seventh aspects, the IAB node comprises a central unit, wherein transmitting the access indication comprises transmitting the access indication to a distributed unit.

In a ninth aspect, alone or in combination with one or more of the sixth through eighth aspects, the IAB node comprises a central unit, wherein transmitting the access indication comprises transmitting the access indication to a parent node.

In a tenth aspect, alone or in combination with one or more of the sixth through ninth aspects, the access indication comprises an implicit indication.

In an eleventh aspect, alone or in combination with the tenth aspect, transmitting the implicit indication comprises transmitting a list of the one or more STC indexes, wherein the STC index that is associated with network access comprises a first STC index of the list.

In a twelfth aspect, alone or in combination with one or more of the tenth through eleventh aspects, transmitting the implicit indication comprises transmitting a list of the one or more STC indexes, wherein the STC index that is associated with network access comprises a last STC index of the list.

In a thirteenth aspect, alone or in combination with one or more of the sixth through twelfth aspects, the STC index that is associated with network access corresponds to a CD-SSB.

In a fourteenth aspect, alone or in combination with the thirteenth aspect, process 700 includes transmitting an indication that the STC index that is associated with network access corresponds to the CD-SSB.

In a fifteenth aspect, alone or in combination with one or more of the fifth through fourteenth aspects, the STC index that is associated with network access corresponds to SSB frequency information that matches a sync-raster frequency.

In a sixteenth aspect, alone or in combination with one or more of the fifth through fifteenth aspects, process 700 includes transmitting a RACH indication that indicates an STC index of the one or more STC indexes that is associated with a RACH configuration.

In a seventeenth aspect, alone or in combination with the sixteenth aspect, the IAB node comprises a distributed unit, and transmitting the RACH indication comprises transmitting the RACH indication to a central unit.

In an eighteenth aspect, alone or in combination with one or more of the sixteenth through seventeenth aspects, the IAB node comprises a central unit, and transmitting the RACH indication comprises transmitting the RACH indication to a parent node of a DU.

In a nineteenth aspect, alone or in combination with the eighteenth aspect, process 700 includes receiving the RACH indication from the DU.

In a twentieth aspect, alone or in combination with one or more of the third through nineteenth aspects, the IAB node comprises a DU, and the enhanced duplexing capability indication indicates the one or more configured SSB resources associated with a served cell for which the DU can support enhanced duplexing with a mobile terminal component carrier.

In a twenty-first aspect, alone or in combination with one or more of the third through twentieth aspects, the IAB node comprises a CU, and the enhanced duplexing capability indication indicates the one or more configured SSB resources associated with a served cell for which a DU can support enhanced duplexing with a mobile terminal component carrier.

In a twenty-second aspect, alone or in combination with the twenty-first aspect, transmitting the enhanced duplexing capability indication comprises transmitting the enhanced duplexing capability indication to a parent node DU of the DU.

In a twenty-third aspect, alone or in combination with one or more of the third through twenty-second aspects, the IAB node comprises an MT, and the enhanced duplexing capability indication indicates the one or more configured SSB resources associated with a served cell for which a co-located DU can support enhanced duplexing with a parent node of the MT, wherein the co-located DU serves the served cell.

In a twenty-fourth aspect, alone or in combination with the twenty-third aspect, transmitting the enhanced duplexing capability indication comprises transmitting the enhanced duplexing capability indication to the parent node.

In a twenty-fifth aspect, alone or in combination with one or more of the twenty-third through twenty-fourth aspects, the enhanced duplexing capability indication indicates the one or more beams associated with the MT with which the co-located DU can support enhanced duplexing with the parent node of the MT.

In a twenty-sixth aspect, alone or in combination with the twenty-fifth aspect, the enhanced duplexing capability indication indicates at least one of an SSB index associated with the one or more configured SSB resources, an STC index associated with the one or more configured SSB resources, a DU cell index associated with the served cell, a transmission configuration indication state associated with the one or more beams, or a sounding reference signal resource indicator associated with the one or more beams.

In a twenty-seventh aspect, alone or in combination with one or more of the third through twenty-sixth aspects, process 700 includes transmitting a CD-SSB indicator that indicates a CD-SSB associated with at least one SSB resource of the one or more configured SSB resources.

In a twenty-eighth aspect, alone or in combination with one or more of the first through twenty-seventh aspects, the one or more resources comprise one or more RACH occasions within a RACH period.

In a twenty-ninth aspect, alone or in combination with the twenty-eighth aspect, the enhanced duplexing capability indication indicates the one or more RACH occasions within the RACH period that can support enhanced duplexing with a mobile terminal component carrier.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
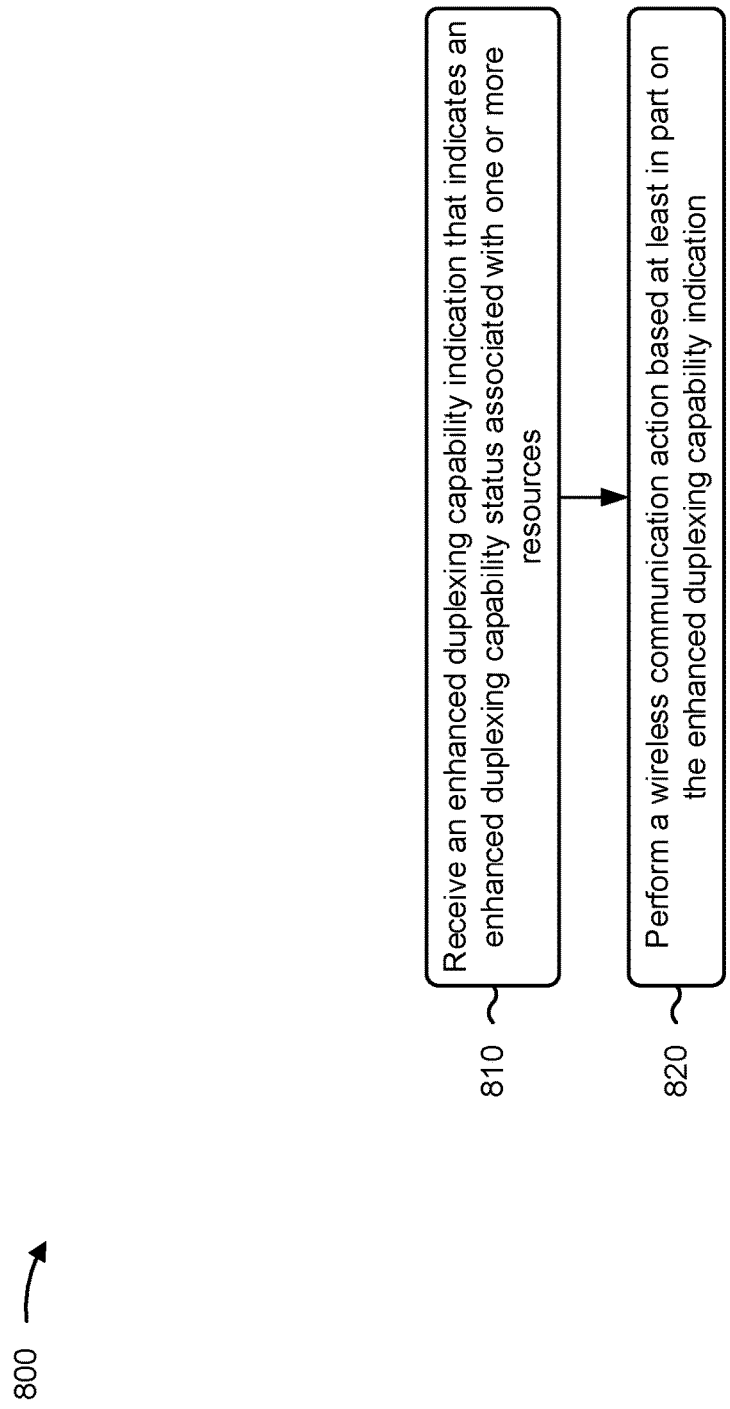

FIG. 8 is a diagram illustrating an example process 800 performed, for example, by an IAB node, in accordance with the present disclosure. Example process 800 is an example where the IAB node (e.g., IAB node 610) performs operations associated with enhanced duplexing capability indication in IAB networks.

As shown in FIG. 8, in some aspects, process 800 may include receiving an enhanced duplexing capability indication that indicates an enhanced duplexing capability status associated with one or more resources (block 810). For example, the IAB node (e.g., using reception component 902, depicted in FIG. 9) may receive an enhanced duplexing capability indication that indicates an enhanced duplexing capability status associated with one or more resources, as described above.

As further shown in FIG. 8, in some aspects, process 800 may include performing a wireless communication action based at least in part on the enhanced duplexing capability indication (block 820). For example, the IAB node (e.g., using reception component 902, transmission component 904, and/or determination component 908, depicted in FIG. 9) may perform a wireless communication action based at least in part on the enhanced duplexing capability indication, as described above.

Process 800 may include additional aspects, such as any single aspect or any combination of aspects described below and/or in connection with one or more other processes described elsewhere herein.

In a first aspect, the one or more resources comprise at least one of a frequency resource, a time resource, or a spatial resource.

In a second aspect, alone or in combination with the first aspect, the one or more resources comprise one or more beams associated with a served cell.

In a third aspect, alone or in combination with one or more of the first and second aspects, the one or more resources comprise one or more configured SSB resources.

In a fourth aspect, alone or in combination with the third aspect, the enhanced duplexing capability indication indicates the one or more configured SSB resources based at least in part on an indication of one or more SSB indexes associated with a served cell.

In a fifth aspect, alone or in combination with the fourth aspect, the enhanced duplexing capability indication indicates the one or more configured SSB resources based at least in part on an indication of one or more STC indexes associated with at least one of the one or more SSB indexes.

In a sixth aspect, alone or in combination with the fifth aspect, process 800 includes receiving an access indication that indicates an STC index of the one or more STC indexes that is associated with network access.

In a seventh aspect, alone or in combination with the sixth aspect, the IAB node comprises a central unit, wherein receiving the access indication comprises receiving the access indication from a central unit.

In an eighth aspect, alone or in combination with the seventh aspect, the IAB node comprises a distributed unit, wherein receiving the access indication comprises receiving the access indication from a central unit.

In a ninth aspect, alone or in combination with the eighth aspect, the IAB node comprises a parent node, wherein receiving the access indication comprises receiving the access indication from a central unit.

In a tenth aspect, alone or in combination with one or more of the sixth through ninth aspects, the access indication comprises an implicit indication.

In an eleventh aspect, alone or in combination with the tenth aspect, receiving the implicit indication comprises receiving a list of the one or more STC indexes, wherein the STC index that is associated with network access comprises a first STC index of the list.

In a twelfth aspect, alone or in combination with one or more of the tenth through eleventh aspects, receiving the implicit indication comprises receiving a list of the one or more STC indexes, wherein the STC index that is associated with network access comprises a last STC index of the list.

In a thirteenth aspect, alone or in combination with one or more of the sixth through twelfth aspects, the STC index that is associated with network access corresponds to a CD-SSB.

In a fourteenth aspect, alone or in combination with the thirteenth aspect, process 800 includes receiving an indication that the STC index that is associated with network access corresponds to the CD-SSB.

In a fifteenth aspect, alone or in combination with one or more of the thirteenth through fourteenth aspects, the STC index that is associated with network access corresponds to SSB frequency information that matches a sync-raster frequency.

In a sixteenth aspect, alone or in combination with one or more of the fifth through fifteenth aspects, process 800 includes receiving a RACH indication that indicates an STC index of the one or more STC indexes that is associated with a RACH configuration.

In a seventeenth aspect, alone or in combination with the sixteenth aspect, the IAB node comprises a central unit, and receiving the RACH indication comprises receiving the RACH indication from a distributed unit.

In an eighteenth aspect, alone or in combination with one or more of the sixteenth or seventeenth the IAB node including a parent node of a distributed unit, and receiving the RACH indication comprises receiving the RACH indication from a central unit.

In a nineteenth aspect, alone or in combination with the eighteenth aspects, the IAB node comprises a central unit, and the enhanced duplexing capability indication indicates the one or more configured SSB resources associated with a served cell for which a distributed unit can support enhanced duplexing with a mobile terminal component carrier.

In a twentieth aspect, alone or in combination with one or more of the first through nineteenth aspects, the IAB node comprises a parent node, and the enhanced duplexing capability indication indicates the one or more configured SSB resources associated with a served cell for which a DU can support enhanced duplexing with a mobile terminal component carrier.

In a twenty-first aspect, alone or in combination with the twentieth aspect, receiving the enhanced duplexing capability indication comprises receiving the enhanced duplexing capability indication from a central unit.

In a twenty-second aspect, alone or in combination with one or more of the first through twenty-first aspects, the IAB node comprises a parent node of an MT, and the enhanced duplexing capability indication indicates the one or more configured SSB resources associated with a served cell for which a DU co-located with the MT can support enhanced duplexing with the parent node of the MT, wherein the co-located DU serves a served cell.

In a twenty-third aspect, alone or in combination with one or more of the first through twenty-second aspects, receiving the enhanced duplexing capability indication comprises receiving the enhanced duplexing capability indication from the MT.

In a twenty-fourth aspect, alone or in combination with one or more of the first through twenty-third aspects, the enhanced duplexing capability indication indicates the one or more configured SSB resources associated with one or more beams.

In a twenty-fifth aspect, alone or in combination with one or more of the first through twenty-fourth aspects, the enhanced duplexing capability indication indicates at least one of an SSB index associated with the one or more configured SSB resources, an STC index associated with the one or more configured SSB resources, a DU cell index associated with a served cell, a transmission configuration indication state associated with the one or more beams, or a sounding reference signal resource indicator associated with the one or more beams.

In a twenty-sixth aspect, alone or in combination with one or more of the first through twenty-fifth aspects, process 800 includes receiving a CD-SSB indicator that indicates a CD-SSB associated with at least one SSB resource of the one or more configured SSB resources.

In a twenty-seventh aspect, alone or in combination with one or more of the first through twenty-sixth aspects, the one or more resources comprise one or more RACH occasions within a RACH period.

In a twenty-eighth aspect, alone or in combination with one or more of the first through twenty-seventh aspects, the enhanced duplexing capability indication indicates the one or more RACH occasions within the RACH period that can support enhanced duplexing with a mobile terminal component carrier.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
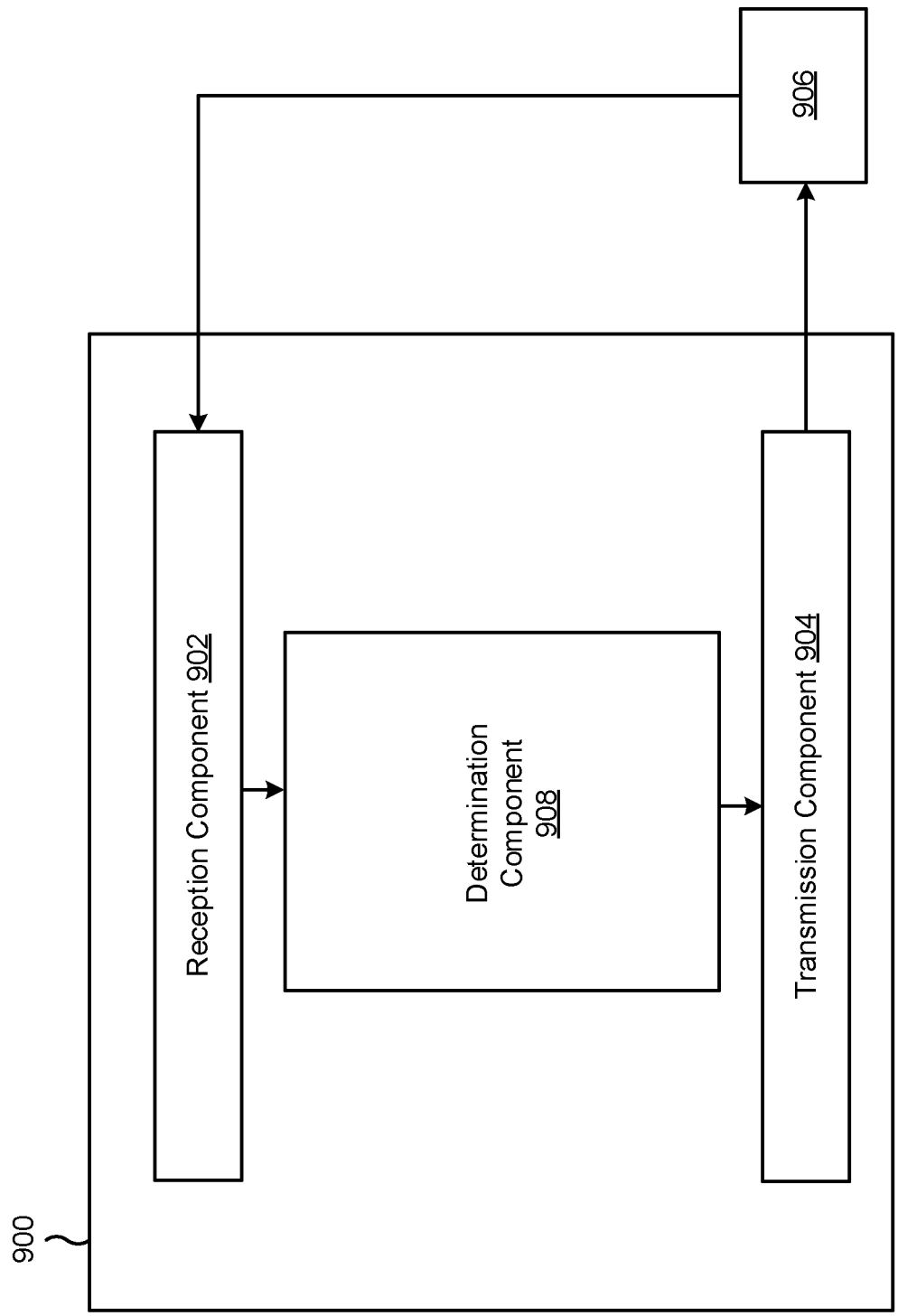
FIG. 9 is a block diagram of an example apparatus for wireless communication, in accordance with the present disclosure.

FIG. 9 is a block diagram of an example apparatus 900 for wireless communication. The apparatus 900 may be a wireless node, or a wireless node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the base station and/or the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station and/or the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station and/or the UE described above in connection with FIG. 2. In some aspects, the transmission component 904 may be co-located with the reception component 902 in a transceiver.

The transmission component 904 may transmit an enhanced duplexing capability indication that indicates an enhanced duplexing capability status associated with one or more resources. The reception component 902 and/or the transmission component 904 may communicate based at least in part on a resource of the one or more resources. The transmission component 904 may transmit an access indication that indicates an STC index of the one or more STC indexes that is associated with network access. The transmission component 904 may transmit an indication that the STC index that is associated with network access corresponds to the CD-SSB. The transmission component 904 may transmit a RACH indication that indicates an STC index of the one or more STC indexes that is associated with a RACH configuration. The reception component 902 may receive the RACH indication from a wireless node.

The transmission component 904 may transmit a CD-SSB indicator that indicates a CD-SSB associated with at least one SSB resource of the one or more configured SSB resources. The reception component 902 may receive an enhanced duplexing capability indication that indicates an enhanced duplexing capability status associated with one or more resources.

The reception component 902, the transmission component 904, and/or the determination component 908 may perform a wireless communication action based at least in part on the enhanced duplexing capability indication. In some aspects, the determination component 908 may include one or more antennas, a modulator, a transmit MIMO processor, a transmit processor, a controller/processor, a memory, or a combination thereof, of the base station and/or UE described above in connection with FIG. 2. In some aspects, the determination component 908 may include the reception component 902 and/or the transmission component 904.

The reception component 902 may receive an access indication that indicates an STC index of the one or more STC indexes that is associated with network access.

The reception component 902 may receive an indication that the STC index that is associated with network access corresponds to a CD-SSB. The reception component 902 may receive a RACH indication that indicates an STC index of the one or more STC indexes that is associated with a RACH configuration. The reception component 902 may receive a CD-SSB indicator that indicates a CD-SSB associated with at least one SSB resource of the one or more configured SSB resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some aspects of the present disclosure:

Aspect 1: A method of wireless communication performed by a wireless node, comprising: transmitting an enhanced duplexing capability indication that indicates an enhanced duplexing capability status associated with one or more resources; and communicating based at least in part on a resource of the one or more resources.

Aspect 2: The method of aspect 1, wherein the one or more resources comprise at least one of: a frequency resource, a time resource, or a spatial resource.

Aspect 3: The method of either of aspects 1 or 2, wherein the one or more resources comprise one or more beams associated with a served cell.

Aspect 4: The method of any of aspects 1-3, wherein the one or more resources comprise one or more configured synchronization signal block (SSB) resources.

Aspect 5: The method of aspect 4, wherein the enhanced duplexing capability indication indicates the one or more configured SSB resources based at least in part on an indication of one or more SSB indexes associated with a served cell.

Aspect 6: The method of aspect 5, wherein the enhanced duplexing capability indication indicates the one or more configured SSB resources based at least in part on an indication of one or more SSB transmission configuration (STC) indexes associated with at least one of the one or more SSB indexes.

Aspect 7: The method of aspect 6, further comprising transmitting an access indication that indicates an STC index of the one or more STC indexes that is associated with network access.

Aspect 8: The method of aspect 7, wherein the IAB node comprises a distributed unit, wherein transmitting the access indication comprises transmitting the access indication to a central unit.

Aspect 9: The method of either of aspect 7 or 8, wherein the IAB node comprises a central unit, wherein transmitting the access indication comprises transmitting the access indication to a distributed unit.

Aspect 10: The method of any of aspects 7-9, wherein the IAB node comprises a central unit, wherein transmitting the access indication comprises transmitting the access indication to a parent node.

Aspect 11: The method of any of aspects 7-10, wherein the access indication comprises an implicit indication.

Aspect 12: The method of aspect 11, wherein transmitting the implicit indication comprises transmitting a list of the one or more STC indexes, wherein the STC index that is associated with network access comprises a first STC index of the list.

Aspect 13: The method of either of aspects 11 or 12, wherein transmitting the implicit indication comprises transmitting a list of the one or more STC indexes, wherein the STC index that is associated with network access comprises a last STC index of the list.

Aspect 14: The method of any of aspects 7-13, wherein the STC index that is associated with network access corresponds to a cell-defining (CD)-SSB.

Aspect 15: The method of aspect 14, further comprising transmitting an indication that the STC index that is associated with network access corresponds to the CD-SSB.

Aspect 16: The method of either of aspects 6-15, wherein the STC index that is associated with network access corresponds to SSB frequency information that matches a sync-raster frequency.

Aspect 17: The method of any of aspects 6-16, further comprising transmitting a random access channel (RACH) indication that indicates an STC index of the one or more STC indexes that is associated with a RACH configuration.

Aspect 18: The method of aspect 17, wherein the IAB node comprises a distributed unit, and wherein transmitting the RACH indication comprises transmitting the RACH indication to a central unit.

Aspect 19: The method of either of aspects 17 or 18, wherein the IAB node comprises a central unit, and wherein transmitting the RACH indication comprises transmitting the RACH indication to a parent node of a distributed unit (DU).

Aspect 20: The method of aspect 19, further comprising receiving the RACH indication from the DU.

Aspect 21: The method of any of aspects 4-20, wherein the IAB node comprises a distributed unit (DU), and wherein the enhanced duplexing capability indication indicates the one or more configured SSB resources associated with a served cell for which the DU can support enhanced duplexing with a mobile terminal component carrier.

Aspect 22: The method of any of aspects 4-21, wherein the IAB node comprises a central unit (CU), and wherein the enhanced duplexing capability indication indicates the one or more configured SSB resources associated with a served cell for which a distributed unit (DU) can support enhanced duplexing with a mobile terminal component carrier.

Aspect 23: The method of aspect 22, wherein transmitting the enhanced duplexing capability indication comprises transmitting the enhanced duplexing capability indication to a parent node DU of the DU.

Aspect 24: The method of any of aspects 4-23, wherein the IAB node comprises a mobile terminal (MT), and wherein the enhanced duplexing capability indication indicates the one or more configured SSB resources associated with a served cell for which a co-located distributed unit (DU) can support enhanced duplexing with a parent node of the MT, wherein the co-located DU serves the served cell.

Aspect 25: The method of aspect 24, wherein transmitting the enhanced duplexing capability indication comprises transmitting the enhanced duplexing capability indication to the parent node.

Aspect 26: The method of either of aspects 24 or 25, wherein the enhanced duplexing capability indication indicates the one or more configured SSB resources associated with one or more beams.

Aspect 27: The method of aspect 26, wherein the enhanced duplexing capability indication indicates at least one of: an SSB index associated with the one or more configured SSB resources, an STC index associated with the one or more configured SSB resources, a DU cell index associated with the served cell, a transmission configuration indication state associated with the one or more beams, or a sounding reference signal resource indicator associated with the one or more beams.

Aspect 28: The method of any of aspects 4-27, further comprising transmitting a cell-defining (CD)-SSB indicator that indicates a CD-SSB associated with at least one SSB resource of the one or more configured SSB resources.

Aspect 29: The method of any of aspects 1-28, wherein the one or more resources comprise one or more random access channel (RACH) occasions within a RACH period.

Aspect 30: The method of aspect 29, wherein the enhanced duplexing capability indication indicates the one or more RACH occasions within the RACH period that can support enhanced duplexing with a mobile terminal component carrier.

Aspect 31: A method of wireless communication performed by an integrated access and backhaul (TAB) node in an IAB network, comprising: receiving an enhanced duplexing capability indication that indicates an enhanced duplexing capability status associated with one or more resources; and performing a wireless communication action based at least in part on the enhanced duplexing capability indication.

Aspect 32: The method of aspect 31, wherein the one or more resources comprise at least one of: a frequency resource, a time resource, or a spatial resource.

Aspect 33: The method of either of aspects 31 or 32, wherein the one or more resources comprise one or more beams associated with a served cell.

Aspect 34: The method of any of aspects 31-33, wherein the one or more resources comprise one or more configured synchronization signal block (SSB) resources.

Aspect 35: The method of aspect 34, wherein the enhanced duplexing capability indication indicates the one or more configured SSB resources based at least in part on an indication of one or more SSB indexes associated with a served cell.

Aspect 36: The method of aspect 35, wherein the enhanced duplexing capability indication indicates the one or more configured SSB resources based at least in part on an indication of one or more SSB transmission configuration (STC) indexes associated with at least one of the one or more SSB indexes.

Aspect 37: The method of aspect 36, further comprising receiving an access indication that indicates an STC index of the one or more STC indexes that is associated with network access.

Aspect 38: The method of aspect 37, wherein the IAB node comprises a central unit, wherein receiving the access indication comprises receiving the access indication from a central unit.

Aspect 39: The method of either of aspects 37 or 38, wherein the IAB node comprises a distributed unit, wherein receiving the access indication comprises receiving the access indication from a central unit.

Aspect 40: The method of any of aspects 37-39, wherein the IAB node comprises a parent node, wherein receiving the access indication comprises receiving the access indication from a central unit.

Aspect 41: The method of any of aspects 37-40, wherein the access indication comprises an implicit indication.

Aspect 42: The method of aspect 41, wherein receiving the implicit indication comprises receiving a list of the one or more STC indexes, wherein the STC index that is associated with network access comprises a first STC index of the list.

Aspect 43: The method of either of aspects 41 or 42, wherein receiving the implicit indication comprises receiving a list of the one or more STC indexes, wherein the STC index that is associated with network access comprises a last STC index of the list.

Aspect 44: The method of any of aspects 37-43, wherein the STC index that is associated with network access corresponds to a cell-defining (CD)-SSB.

Aspect 45: The method of aspect 44, further comprising receiving an indication that the STC index that is associated with network access corresponds to the CD-SSB.

Aspect 46: The method of either of aspects 44 or 45, wherein the STC index that is associated with network access corresponds to SSB frequency information that matches a sync-raster frequency.

Aspect 47: The method of aspect 46, further comprising receiving a random access channel (RACH) indication that indicates an STC index of the one or more STC indexes that is associated with a RACH configuration.

Aspect 48: The method of aspect 47, wherein the IAB node comprises a central unit, and wherein receiving the RACH indication comprises receiving the RACH indication from a distributed unit.

Aspect 49: The method of either of aspects 47 or 48, wherein the IAB node comprises a parent node of a distributed unit, and wherein receiving the RACH indication comprises receiving the RACH indication from a central unit.

Aspect 50: The method of any of aspects 34-49, wherein the IAB node comprises a central unit, and wherein the enhanced duplexing capability indication indicates the one or more configured SSB resources associated with a served cell for which a distributed unit can support enhanced duplexing with a mobile terminal component carrier.

Aspect 51: The method of any of aspects 34-50, wherein the IAB node comprises a parent node, and wherein the enhanced duplexing capability indication indicates the one or more configured SSB resources associated with a served cell for which a distributed unit (DU) can support enhanced duplexing with a mobile terminal component carrier.

Aspect 52: The method of aspect 51, wherein receiving the enhanced duplexing capability indication comprises receiving the enhanced duplexing capability indication from a central unit.

Aspect 53: The method of any of aspects 34-52, wherein the IAB node comprises a parent node of a mobile terminal (MT), and wherein the enhanced duplexing capability indication indicates the one or more configured SSB resources associated with a served cell for which a distributed unit (DU) co-located with the MT can support enhanced duplexing with the parent node of the MT, wherein the co-located DU serves a served cell.

Aspect 54: The method of aspect 53, wherein receiving the enhanced duplexing capability indication comprises receiving the enhanced duplexing capability indication from the MT.

Aspect 55: The method of either of aspects 53 or 54, wherein the enhanced duplexing capability indication indicates the one or more configured SSB resources associated with one or more beams.

Aspect 56: The method of aspect 55, wherein the enhanced duplexing capability indication indicates at least one of: an SSB index associated with the one or more configured SSB resources, an STC index associated with the one or more configured SSB resources, a DU cell index associated with a served cell, a transmission configuration indication state associated with the one or more beams, or a sounding reference signal resource indicator associated with the one or more beams.

Aspect 57: The method of any of aspects 34-56, further comprising receiving a cell-defining (CD)-SSB indicator that indicates a CD-SSB associated with at least one SSB resource of the one or more configured SSB resources.

Aspect 58: The method of any of aspects 31-57, wherein the one or more resources comprise one or more random access channel (RACH) occasions within a RACH period.

Aspect 59: The method of aspect 58, wherein the enhanced duplexing capability indication indicates the one or more RACH occasions within the RACH period that can support enhanced duplexing with a mobile terminal component carrier.

Aspect 60: An apparatus for wireless communication at a device, comprising a processor; memory coupled with the processor; and instructions stored in the memory and executable by the processor to cause the apparatus to perform the method of one or more aspects of aspects 1-30.

Aspect 61: A device for wireless communication, comprising a memory and one or more processors coupled to the memory, the one or more processors configured to perform the method of one or more aspects of aspects 1-30.

Aspect 62: An apparatus for wireless communication, comprising at least one means for performing the method of one or more aspects of aspects 1-30.

Aspect 63: A non-transitory computer-readable medium storing code for wireless communication, the code comprising instructions executable by a processor to perform the method of one or more aspects of aspects 1-30.

Aspect 64: A non-transitory computer-readable medium storing a set of instructions for wireless communication, the set of instructions comprising one or more instructions that, when executed by one or more processors of a device, cause the device to perform the method of one or more aspects of aspects 1-30.

Aspect 65: An apparatus for wireless communication at a device, comprising a processor; memory coupled with the processor; and instructions stored in the memory and executable by the processor to cause the apparatus to perform the method of one or more aspects of aspects 31-59.

Aspect 66: A device for wireless communication, comprising a memory and one or more processors coupled to the memory, the one or more processors configured to perform the method of one or more aspects of aspects 31-59.

Aspect 67: An apparatus for wireless communication, comprising at least one means for performing the method of one or more aspects of aspects 31-59.

Aspect 68: A non-transitory computer-readable medium storing code for wireless communication, the code comprising instructions executable by a processor to perform the method of one or more aspects of aspects 31-59.

Aspect 69: A non-transitory computer-readable medium storing a set of instructions for wireless communication, the set of instructions comprising one or more instructions that, when executed by one or more processors of a device, cause the device to perform the method of one or more aspects of aspects 31-59.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, and/or not equal to the threshold, among other examples.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication, comprising:
one or more memories; and
one or more processors coupled to the one or more memories, the one or more processors configured to:
transmit an enhanced duplexing capability indication that indicates an enhanced duplexing capability status of an integrated access and backhaul (IAB) node for simultaneous communication via a mobile terminal (MT) of the IAB node and via a distributed unit (DU) of the IAB node,
wherein the enhanced duplexing capability indication indicates a conditional capability of the IAB node to support an enhanced duplexing case, associated with the simultaneous communication, for a resource; and
communicate via an IAB network based at least in part on the resource indicated by the enhanced duplexing capability indication.

2. The wireless node of claim 1, wherein the resource comprises at least one of:
a frequency resource,
a time resource, or
a spatial resource.

3. The wireless node of claim 1, wherein the resource comprises one or more beams associated with a served cell.

4. The wireless node of claim 1, wherein the resource comprises one or more configured synchronization signal block (SSB) resources.

5. The wireless node of claim 4, wherein the enhanced duplexing capability indication indicates the one or more configured SSB resources based at least in part on an indication of one or more SSB indexes associated with a served cell.

6. The wireless node of claim 5, wherein the enhanced duplexing capability indication indicates the one or more configured SSB resources based at least in part on an indication of one or more SSB transmission configuration (STC) indexes associated with at least one of the one or more SSB indexes.

7. The wireless node of claim 6, wherein the one or more processors are further configured to transmit an access indication that indicates an STC index of the one or more STC indexes that is associated with network access.

8. The wireless node of claim 7, wherein the access indication comprises an implicit indication.

9. The wireless node of claim 8, wherein the one or more processors, when transmitting the implicit indication, are configured to transmit a list of the one or more STC indexes, wherein the STC index that is associated with network access comprises a first STC index of the list or a last STC index of the list.

10. The wireless node of claim 7, wherein the STC index that is associated with network access corresponds to a cell-defining (CD)-SSB.

11. The wireless node of claim 10, wherein the one or more processors are further configured to transmit an indication that the STC index that is associated with network access corresponds to the CD-SSB.

12. The wireless node of claim 6, wherein the one or more processors are further configured to transmit a random access channel (RACH) indication that indicates an STC index of the one or more STC indexes that is associated with a RACH configuration.

13. The wireless node of claim 4, wherein the enhanced duplexing capability indication indicates the one or more configured SSB resources associated with a served cell for which the wireless node can support enhanced duplexing.

14. The wireless node of claim 1, wherein the resource comprises one or more random access channel (RACH) occasions within a RACH period, and wherein the enhanced duplexing capability indication indicates the one or more RACH occasions within the RACH period that can support enhanced duplexing.

15. A wireless node for wireless communication, comprising:
- one or more memories; and
- one or more processors coupled to the one or more memories, the one or more processors configured to:
  - receive an enhanced duplexing capability indication that indicates an enhanced duplexing capability status of an integrated access and backhaul (IAB) node for simultaneous communication via a mobile terminal (MT) of the IAB node and via a distributed unit (DU) of the IAB node,
    wherein the enhanced duplexing capability indication indicates a conditional capability of the IAB node to support an enhanced duplexing case, associated with the simultaneous communication, for a resource; and
  - communicate via an IAB network based at least in part on the resource indicated by the enhanced duplexing capability indication.

16. The wireless node of claim 15, wherein the resource comprises at least one of:
- a frequency resource,
- a time resource, or
- a spatial resource.

17. The wireless node of claim 15, wherein the resource comprises one or more configured synchronization signal block (SSB) resources.

18. The wireless node of claim 17, wherein the enhanced duplexing capability indication indicates the one or more configured SSB resources based at least in part on an indication of one or more SSB indexes associated with a served cell.

19. The wireless node of claim 18, wherein the enhanced duplexing capability indication indicates the one or more configured SSB resources based at least in part on an indication of one or more SSB transmission configuration (STC) indexes associated with at least one of the one or more SSB indexes.

20. The wireless node of claim 19, wherein the one or more processors are further configured to receive an access indication that indicates an STC index of the one or more STC indexes that is associated with network access.

21. The wireless node of claim 20, wherein the access indication comprises an implicit indication.

22. The wireless node of claim 21, wherein the one or more processors, when receiving the implicit indication, are configured to receive a list of the one or more STC indexes, wherein the STC index that is associated with network access comprises a first STC index of the list or a last STC index of the list.

23. The wireless node of claim 19, wherein the one or more processors are further configured to receive a random access channel (RACH) indication that indicates an STC index of the one or more STC indexes that is associated with a RACH configuration.

24. The wireless node of claim 17, wherein the enhanced duplexing capability indication indicates the one or more configured SSB resources associated with a served cell for which a distributed unit can support enhanced duplexing.

25. The wireless node of claim 15, wherein the resource comprises one or more random access channel (RACH) occasions within a RACH period, and wherein the enhanced duplexing capability indication indicates the one or more RACH occasions within the RACH period that can support enhanced duplexing.

26. A method of wireless communication performed by a wireless node, comprising:
- transmitting an enhanced duplexing capability indication that indicates an enhanced duplexing capability status of an integrated access and backhaul (IAB) node for simultaneous communication via a mobile terminal (MT) of the IAB node and via a distributed unit (DU) of the IAB node,
  wherein the enhanced duplexing capability indication indicates a conditional capability of the IAB node to support an enhanced duplexing case, associated with the simultaneous communication, for a resource; and
- communicating via an IAB network based at least in part on the resource indicated by the enhanced duplexing capability indication.

27. The method of claim 26, wherein the resource comprises one or more configured synchronization signal block (SSB) resources, wherein the enhanced duplexing capability indication indicates the one or more configured SSB resources based at least in part on an indication of one or more SSB indexes associated with a served cell, and wherein the enhanced duplexing capability indication indicates the one or more configured SSB resources based at least in part on an indication of one or more SSB transmission configuration (STC) indexes associated with at least one of the one or more SSB indexes.

28. The method of claim 26, wherein the resource comprises one or more random access channel (RACH) occasions within a RACH period, and wherein the enhanced duplexing capability indication indicates the one or more RACH occasions within the RACH period that can support enhanced duplexing with a mobile terminal component carrier.

29. A method of wireless communication performed by an integrated access and backhaul (IAB) node in an IAB network, comprising:
- receiving an enhanced duplexing capability indication that indicates an enhanced duplexing capability status of an integrated access and backhaul (IAB) node for simultaneous communication via a mobile terminal (MT) of the IAB node and via a distributed unit (DU) of the IAB node,
  wherein the enhanced duplexing capability indication indicates a conditional capability of the IAB node to support an enhanced duplexing case, associated with the simultaneous communication, for a resource; and
- communicating via an IAB network based at least in part on the resource indicated by the enhanced duplexing capability indication.

30. The method of claim 29, wherein the resource comprises:
- one or more configured synchronization signal block (SSB) resources, or
- one or more random access channel (RACH) occasions within a RACH period.

* * * * *